April 25, 1939. J. W. MARSH 2,155,434
TRANSMISSION MECHANISM
Filed Oct. 20, 1936 2 Sheets-Sheet 1
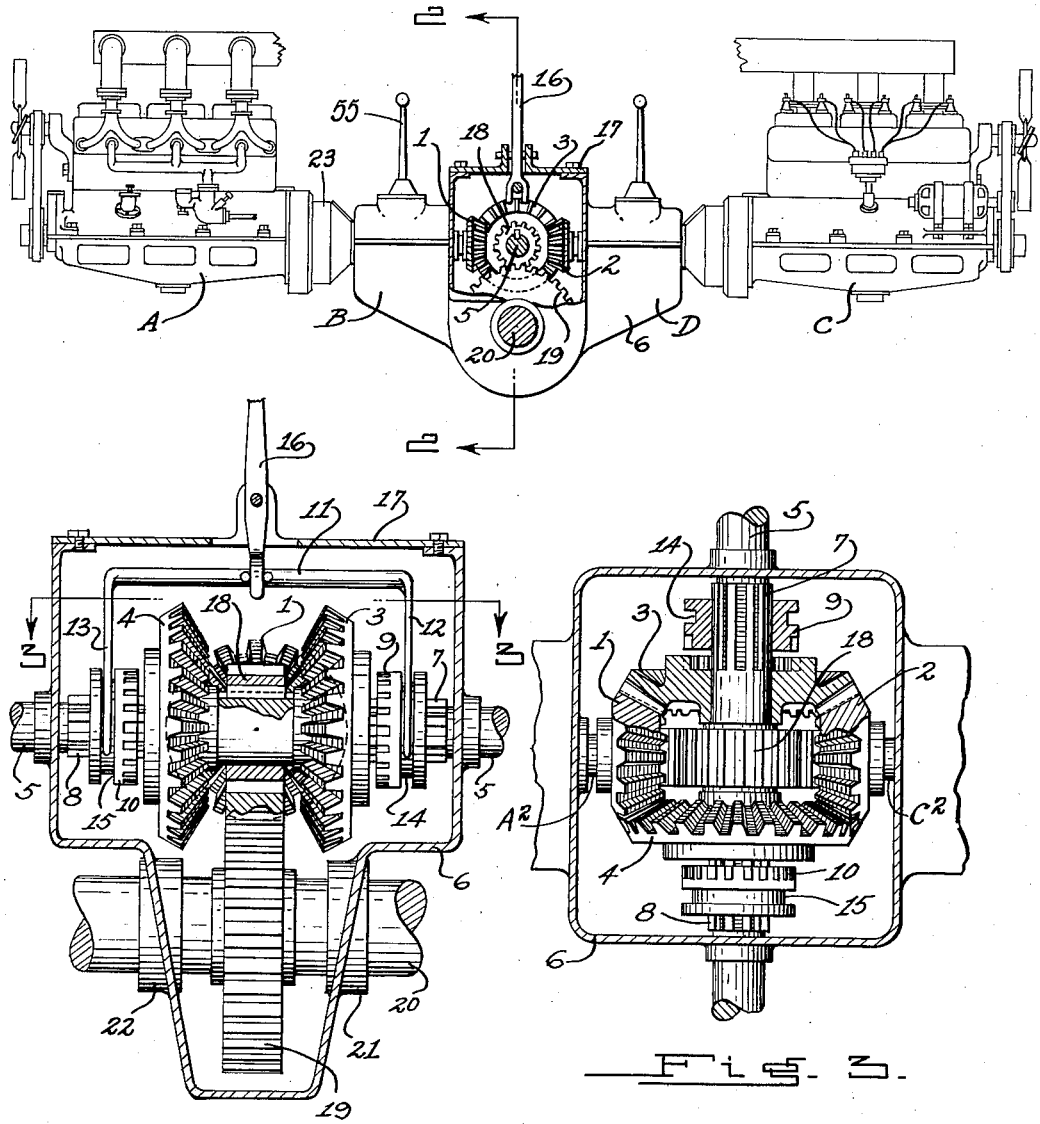
John W. Marsh
INVENTOR.
BY Adam Richmond
ATTORNEYS.

April 25, 1939. J. W. MARSH 2,155,434
TRANSMISSION MECHANISM
Filed Oct. 20, 1936 2 Sheets-Sheet 2
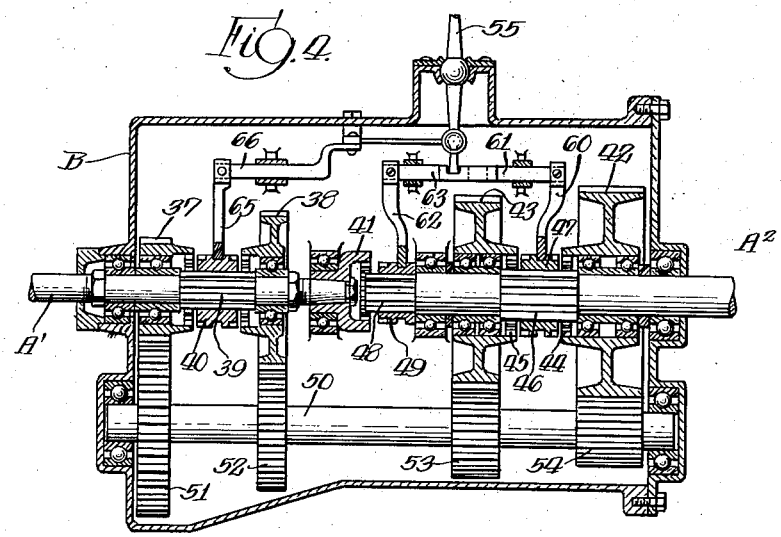
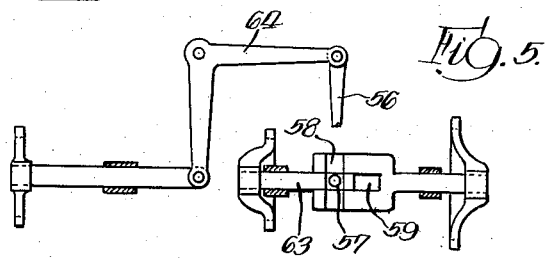
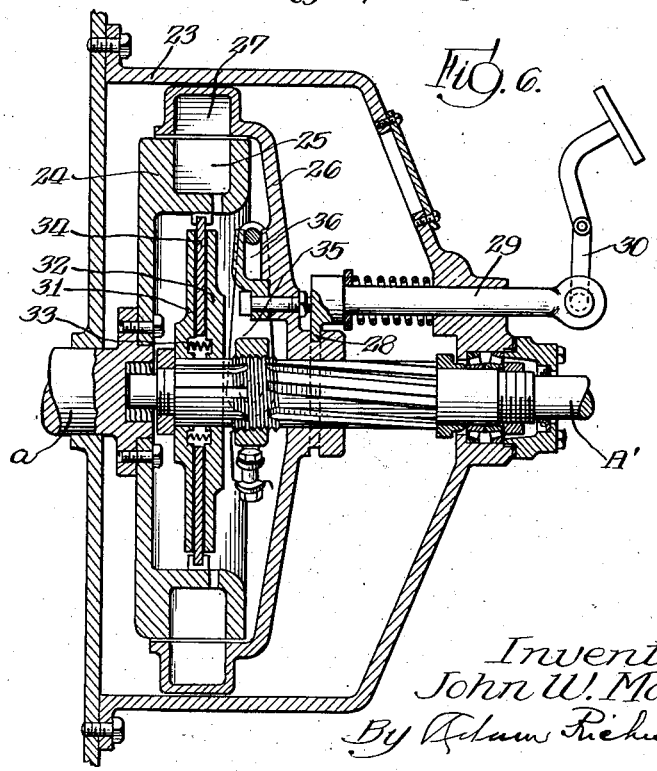
Inventor:
John W. Marsh,
By Adam Richmond Attys.

Patented Apr. 25, 1939

2,155,434

UNITED STATES PATENT OFFICE 2,155,434

TRANSMISSION MECHANISM

John W. Marsh, Washington, D. C.

Application October 20, 1936, Serial No. 106,574

5 Claims. (Cl. 74—389)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to improvements in a transmission mechanism for transmitting power from a pair of prime movers or driving shafts to a single driven shaft. More particularly, the invention comprehends a reversing transmission mechanism for combining the power from a pair of engines each acting through their respective clutches and speed change transmission units.

One of the objects of this invention is to provide a means for transmitting power from a pair of engines or driving shafts to a driven shaft in either rotational direction and over a wide range of speeds.

Another object of this invention is to provide a means for changing the relative speeds between a pair of engines and a driven shaft by means of gears without the momentary complete loss of torque experienced with other change gear mechanisms.

Another object of this invention is to provide a means for the selective operation of either or both driving units in transmitting power to a driven shaft.

Another object of this invention is to provide a means for the utilization of a single mechanism in connection with a pair of driving units to transmit power in either direction to the shaft placed transversally to the driving units.

To attain the aforesaid and other objects there is provided a pair of change gear transmissions symmetrically located one on each side of and transverse to a driven shaft, each transmitting power to a bevel pinion, each of which meshes with a pair of bevel gears rotatably mounted on the driven shaft and capable of being individually secured to the driven shaft.

Other objects and features of this invention will become apparent and more clearly understood from the following specification when considered in connection with the accompanying drawings, wherein I have illustrated preferred embodiments of the invention. It is to be understood, however, that these drawings are to be considered as illustrative rather than in a limiting sense the important and novel features of the invention being pointed out more particularly in the appended claims.

In the accompanying drawings:

Figure 1 is a side elevation of a pair of internal combustion motors, their respective clutches and gear change transmissions with a partial sectional view of the reversible transmission gearing and final drive mechanism.

Figure 2 is a transverse partial sectional view of the reverse mechanism and final drive taken on the line 2—2 of Figure 1. The reversing mechanism is shown in neutral position.

Figure 3 is a longitudinal partial sectional view of the reversing mechanism in its neutral position taken on the line 3—3 of Figure 2.

Fig. 4 is a sectional view through a form of speed-ratio-change mechanism;

Fig. 5 is a fragmentary plan view of the gear operating levers shown in Fig. 4; and Fig. 6 is a sectional view through a clutch, such as adapted for use.

Referring more particularly to the accompanying drawings, the reference letter A is used to indicate a prime mover connected to a gear change transmission B through a clutch, such as described in my application Serial No. 90,938, filed July 16, 1936, or any other type of free wheeling device as desired although such a clutch is not essential to the operation of the invention. Similarly, a prime mover C is connected to a gear change transmission D through a suitable clutch. The entire assembly is suitably supported in the frame of a vehicle or other device to which it is applied.

The construction of the clutch and speed changing mechanism will be described hereinafter. Transmission assemblies B and D may be identical in construction or may be arranged for different numbers of speed changes as may be required by the application and as hereinafter described.

With further reference to the accompanying drawings, the reference numeral 1 is used to indicate a bevel pinion driven from the transmission B and, similarly, reference numeral 2 indicates a bevel pinion driven from transmission D. The bevel pinions 1 and 2 mesh with a pair of oppositely faced bevel gears 3 and 4 which are loose on a transverse shaft 5 journaled in the side walls of a gear case 6 and continuously rotate in opposite directions on the said shaft 5. The beveled gears 3 and 4 are provided upon their outer sides with recesses formed with internal gear teeth which mesh with corresponding teeth of a pair of dental clutch collars 9 and 10 respectively. The dental clutch collars 9 and 10 are slidably mounted on longitudinal splines 7 and 8 respectively of the shaft 5, and are provided with annular grooves 14 and 15.

A shifting fork 11, provided with bifurcated ends 12 and 13 which are received by the annular grooves 14 and 15 of the dental clutch collars 9 and 10 respectively, is operated by a reversing lever 16 pivotally supported on a gear case cover 17 to lock either beveled gear 3 or 4 into direct engagement with the shaft 5 depending upon the desired direction of motion of the vehicle.

For effecting the final drive a pinion 18 is keyed to the shaft 5 and meshes with a gear 19, similarly secured to a final drive shaft 20. The drive shaft 20 is suitably supported by a pair of bearings 21 and 22 carried in the gear-case 6.

A single gear case 6 houses the reversing mechanism and the two transmission units. Partitions within the gear case separate the centrally located reversing mechanism from the transmission units and provide bearing supports for the shafts of the pinions 1 and 2.

It is apparent that with both engines A and C turning clockwise when facing the fan ends, and through their respective transmissions B and D, turning bevel pinions 1 and 2, the power of both engines will be transmitted to the bevel gears 3 and 4. The transverse movement of the reverse levers 16 will operate the shifting fork 11 and engage the dental clutch 9 with the bevel gear 3, or the dental clutch 10 with bevel gear 4, thereby securing either bevel gear 3 or 4 to shaft 5 for forward or reverse motion.

It is further apparent that when engine A is disconnected from the bevel pinion 1 either by disengaging the clutch between engine A and transmission B or by placing transmission B in neutral position, engine C will continue to drive the bevel pinion 2 and, through the mechanism shown, the shaft 5 and the final drive shaft 20. Similarly, when engine C is disconnected, engine A will continue to drive the bevel pinion 1 and, through the mechanism shown, the shaft 5 and the final drive shaft 20. Thus the clutch on engine A may be disengaged and change effected in the speed ratio between engine A and the final drive mechanism through transmission B while engine C continues to drive the final drive mechanism and similarly the clutch on engine C may be disengaged and a change effected in the speed ratio between engine C and the final drive mechanism through transmission D while engine A continues to drive the final drive mechanism.

It is further apparent that either engine may be disconnected from the final drive mechanism and the other engine continue to drive the final drive mechanism when operating conditions are such that the power of only one engine is required.

It is further apparent that any number of variety of speed changes may be obtained by suitable arrangement of gear ratios in transmissions B and D and by alternately shifting the gears in these transmissions.

It is also apparent that the final drive may be taken from the shaft 5 and pinion 18 omitting the gear 19 and its shaft 20.

A clutch contained within a suitable housing 23, may be constructed as shown in Fig. 6; one member 24 of the clutch being fixed to the engine crank shaft $a$. The clutch shown is of the liquid type, pockets 25 being shown in the member 24. A cooperating clutch member 26 provided with buckets 27 is moved by means of a yoke 28 and a shaft 29 into engaging and disengaging positions. Operating means for the shaft 29 are indicated diagrammatically, such as a foot pedal 30. The clutch includes mechanical friction elements such as the discs 31—32, normally separated by the springs 33 and engaging a plate 34 carried by the clutch member 24, these plates being operated through the arm 35, the free end of which engages in a guide-way 36 in the member 26.

This mechanism is shown and described in detail in my copending application, Serial No. 90,938, filed July 16, 1936.

The power transmitted through the clutch is delivered by shaft A—1 into a transmission mechanism, best shown in Figs. 4 and 5.

As shown in those figures, the shaft A—1 enters the transmission casing B and carries gears 37—38 freely rotatable thereon, the gears having teeth on their hubs, the shaft being provided with splines 39 on which a clutch 40 is slidable. At its extreme inner end, the shaft A—1 carries a jaw clutch 41.

Power is delivered from the transmission casing through a shaft A—2 into the reversing gear mechanism, best shown in Figs. 2 and 3, the end of the shaft A—2 carrying the bevelled pinion 1. The clutch and transmission connected to the prime mover C may be a duplicate of that shown in Figs. 4 to 6, the shaft C—2 being connected to the transmission and carrying bevelled pinion 2.

The shaft A—2 carries within the transmission casing B, the gears 42—43, the gears being freely rotatable thereon and having teeth 44—45 in their hubs. The shaft A—2 is splined as at 46 and a clutch member 47 slides thereon with capacity for selective engagement with the teeth on the gears 42—43. At its extreme inner end, the shaft A—2 has a second splined portion 48 carrying a clutch 49 adapted to engage the clutch member 41.

A countershaft 50 carries gears 51—52—53—54 in constant mesh with the respective gears 37—38, 43—42.

An operating lever 55 is carried in the casing and has a connection at its lower end to an arm 56 and to a slide 57 operating selectively either in the transverse slide-way 58 or the longitudinal slide-way 59. A yoke 60 is connected to a slide bar 61 which carries the slide-way 59 while a yoke 62 is carried by a slide bar 63 movable in the slide-way 59.

The arm 56 is connected to a bell crank 64, a yoke 65 movable by the slide bar 66 being connected to the other end of the bell crank.

For direct drive, the shaft lever is moved to cause engagement between the clutch 49 and the clutch member 41 of the shaft A—1. To enable this engagement, the shaft lever 55 must be in a vertical position so that the slide bar 63 may move in the slide-way 59. For the four different speed changes, the parts are manipulated as follows:

Clutches 40 and 47 are engaged with gears 37—42, the path of power being from the shaft A—1 through gears 37—51, shaft 50 and gears 54—42 to shaft A—2.

For second speed, clutches 40—47 are engaged with gears 37—43, the path of power being through gears 37—51, shaft 50 and gears 53—43 to shaft 18.

For third speed, clutch 40 is engaged with gear 38 and clutch 47 with gear 42, the path of power being through gears 38—52, shaft 50 and gears 54—42.

For fourth speed, clutches 40—47 are engaged with gears 38—43, the path of power being through gears 38—52, shaft 50, and gears 53, 43 to the shaft A—2.

This transmission mechanism is shown and described in detail in my copending application, Serial No. 106,573, filed October 20, 1936.

Having described my invention, what I claim as new and wish to secure by Letters Patent is:

1. In a power transmission assembly, the combination of two prime movers, an independent clutch and an independent gear-ratio-changing mechanism associated with each prime mover, a reversing mechanism to which the power output shafts from said ratio changing mechanisms are connected, said reversing mechanism including means alternately coacting with the clutch and gear-ratio-changing mechanism of the respective prime-movers to permit a change in the ratio of power transmission from one prime mover without interrupting the delivery of power from the other prime mover.

2. In a power transmission assembly, the combination of two prime movers, an independent clutch and an independent, selective speed-changing mechanism associated with each prime-mover, a reversing mechanism receiving the torque from both gear changing mechanisms, said reversing mechanism including means alternately coacting with the clutch and speed changing mechanism of the respective prime-movers to enable a selective change of speed ratio of one speed-change device while the other speed-change device is delivering the full torque of the prime mover to the reversing mechanism.

3. In a power transmission assembly, the combination of a pair of prime movers mounted in end-to-end relation, a separate clutch connected to the crank shaft of each prime mover, a selective, independent multiple change-speed device connected to each of said clutches, the output shaft from each change-speed device being connected to a common driven shaft constituting a final drive, and means alternately coacting with the clutch and change speed device of the respective prime-movers to afford independent manipulation of said change speed device said change speed device whereby the gear ratio of one of said change speed devices may be changed while the other speed change device is delivering the full power of its prime mover to the driven shaft.

4. In a power transmission assembly, the combination of two prime movers, an independent clutch and an independent gear-ratio-changing mechanism associated with each prime mover, a reversing mechanism to which the power output shafts from said ratio changing mechanisms are connected, said reversing mechanism including means for effecting its operation and additional means alternately coacting with the clutch and gear-ratio-changing mechanism of the respective prime-movers to permit a change to be made in the ratio of power transmission from one prime mover without interrupting the delivery of power from the other prime mover.

5. In a power transmission assembly, the combination of dual power plants arranged in end to end relation, a clutch and a transmission unit operatively associated with each other and with each of the power plants, a final drive and a reversing mechanism interposed between the output shafts of the transmission units and the final drive, said reversing mechanism including means alternately coacting with the clutch and transmission units of the respective prime-movers to permit a change of gear ratio to be made in one of the transmission units without interrupting the flow of power through the other of said transmission units to the final drive.

JOHN W. MARSH.